US012545014B2

(12) United States Patent
Toni et al.

(10) Patent No.: US 12,545,014 B2
(45) Date of Patent: Feb. 10, 2026

(54) SEALABLE AND EASY OPENING POLYESTER FILMS

(71) Applicant: Cryovac, LLC, Charlotte, NC (US)

(72) Inventors: Enrico Toni, Fossombrone (IT);
Romano Spigaroli, Legnano (IT)

(73) Assignee: Cryovac, LLC, Charlotte, NC (US)

(*) Notice: Subject to any disclaimer, the term of this patent is extended or adjusted under 35 U.S.C. 154(b) by 0 days.

(21) Appl. No.: 16/768,983

(22) PCT Filed: Dec. 5, 2018

(86) PCT No.: PCT/EP2018/083658
§ 371 (c)(1),
(2) Date: Jun. 2, 2020

(87) PCT Pub. No.: WO2019/110665
PCT Pub. Date: Jun. 13, 2019

(65) Prior Publication Data
US 2020/0331242 A1 Oct. 22, 2020

(30) Foreign Application Priority Data

Dec. 5, 2017 (EP) ..................................... 17205550

(51) Int. Cl.
*B32B 27/08* (2006.01)
*B32B 27/30* (2006.01)
*B32B 27/36* (2006.01)
*B65D 65/40* (2006.01)

(52) U.S. Cl.
CPC ............ *B32B 27/08* (2013.01); *B32B 27/308* (2013.01); *B32B 27/36* (2013.01); *B65D 65/40* (2013.01); *B32B 2250/04* (2013.01); *B32B 2250/24* (2013.01); *B32B 2255/10* (2013.01); *B32B 2255/24* (2013.01); *B32B 2307/31* (2013.01); *B32B 2307/514* (2013.01); *B32B 2307/736* (2013.01); *B32B 2439/70* (2013.01); *B32B 2439/80* (2013.01)

(58) Field of Classification Search
CPC . B32B 27/08; B32B 2439/80; B32B 2439/70; B32B 2307/736; B32B 2307/514; B32B 2307/31; B32B 2255/24; B32B 255/10; B32B 2250/24; B32B 2250/04; B32B 27/36; B32B 27/308; B32B 2250/03; B32B 2250/05; C08L 67/04; C08L 2205/02; C08L 2205/025
See application file for complete search history.

(56) References Cited

U.S. PATENT DOCUMENTS

| | | | | |
|---|---|---|---|---|
| 4,198,327 A * | 4/1980 | Matsumoto | ............ | C09J 151/06 428/521 |
| 4,436,895 A * | 3/1984 | Barbee | ............... | C08G 63/6856 528/173 |
| 5,273,797 A | 12/1993 | Hazelton et al. | | |
| 5,382,628 A * | 1/1995 | Stewart | .................... | C08L 67/02 525/173 |
| 5,525,672 A * | 6/1996 | Jones | ...................... | C09J 123/04 525/74 |
| 5,882,749 A | 3/1999 | Jones et al. | | |
| 6,287,656 B1 * | 9/2001 | Turner | ....................... | C08J 5/18 528/97 |
| 6,329,489 B1 * | 12/2001 | Gregorovich | ........ | C09D 183/10 528/106 |
| 6,503,549 B1 * | 1/2003 | Mueller | ................... | B32B 27/36 426/396 |
| 6,514,445 B1 * | 2/2003 | Cann | ..................... | A46B 5/0025 264/273 |
| 6,743,872 B1 * | 6/2004 | Eisch | ........................ | C07F 7/28 526/170 |
| 8,530,012 B2 | 9/2013 | Siegel et al. | | |
| 8,617,677 B2 | 12/2013 | Trouilhet et al. | | |
| 2002/0198420 A1 * | 12/2002 | Nguyen | ..................... | C07C 2/70 585/446 |
| 2006/0105126 A1 * | 5/2006 | Kendig | ................... | B32B 27/30 428/35.2 |
| 2006/0177674 A1 * | 8/2006 | Aritake | ................... | B32B 27/08 156/244.11 |
| 2007/0254118 A1 * | 11/2007 | Opusko | ................... | B32B 27/08 428/34.9 |
| 2010/0224529 A1 * | 9/2010 | Forloni | ................. | B29C 55/023 206/524.1 |
| 2012/0111760 A1 | 5/2012 | Benedetti et al. | | |
| 2013/0029553 A1 | 1/2013 | Trouilhet et al. | | |
| 2013/0224411 A1 * | 8/2013 | Montcrieff | ............ | B29C 48/022 428/35.7 |
| 2014/0127437 A1 | 5/2014 | Malfait et al. | | |
| 2014/0363546 A1 | 12/2014 | Zhou et al. | | |

(Continued)

FOREIGN PATENT DOCUMENTS

| CA | 2253098 A1 * | 5/1999 |
|---|---|---|
| EP | 1658973 A1 | 5/2006 |

(Continued)

OTHER PUBLICATIONS

Mesnil, Philippe et al., Seal Through Contamination Performance of Metallocene Plastomers, (Year: 2014).*
Mount, E.M., Biaxially stretched films for use in snack packaging, Woodhead Publishing (Year: 2011).*
Technical Data Sheet for Eastar Copolyester 6763 published online by Eastman Chemical Co. (Year: 2016).*
Eastar™ Copolyester 6763 published on line at https://productcatalog.eastman.com/tds/ProdDatasheet.aspx?product=71040786&pn=Eastar+6763+Copolyester and accessed Nov. 8, 2022 (Year: 2022).*

(Continued)

*Primary Examiner* — James C Yager
(74) *Attorney, Agent, or Firm* — Jason R. Womer

(57) ABSTRACT

The invention discloses a heat sealable coextruded multilayer polyester based lidding film that forms hermetic and easy opening seals onto polyester containers and its use in food packaging.

18 Claims, No Drawings

(56) References Cited

U.S. PATENT DOCUMENTS

| | | | | |
|---|---|---|---|---|
| 2015/0148729 A1* | 5/2015 | Pinchuk | ............ | A61M 27/002 |
| | | | | 604/8 |
| 2016/0001530 A1* | 1/2016 | Uto | ................. | B32B 27/20 |
| | | | | 428/423.1 |
| 2020/0316924 A1* | 10/2020 | Brown | ............... | B32B 27/08 |

FOREIGN PATENT DOCUMENTS

| | | | | | |
|---|---|---|---|---|---|
| EP | 2361749 | A1 | 8/2011 | | |
| EP | 2508338 | B1 | 10/2016 | | |
| WO | WO-0069959 | A2 * | 11/2000 | ............ | C08F 10/00 |
| WO | WO-2015066570 | A1 * | 5/2015 | ............ | B32B 1/08 |
| WO | 2016083521 | A1 | 6/2016 | | |
| WO | 16182831 | A1 | 11/2016 | | |
| WO | 2017153439 | A1 | 9/2017 | | |

OTHER PUBLICATIONS

Technical Data Sheet for Eastar Copolyester 6763 by Eastman dated Apr. 11, 2016 and available online at https://upmold.com/wp-content/uploads/Datasheet/PETG%20ws_eastman_com_ProductCatalogApps_PageControllers_ProdDatash.pdf (Year: 2016).*

* cited by examiner

SEALABLE AND EASY OPENING POLYESTER FILMS

TECHNICAL FIELD

The present invention relates to a multilayer polyester based film and its use as lidding film in food packaging.

The film provides a hermetic and easy opening package when heat sealed onto polyester containers.

BACKGROUND ART

Packaging systems comprising a rigid heat-stable container covered with a thin flexible thermoplastic film sealed onto it are commonly used for hermetically packaging food products, in particular ovenable or case-ready products such as meat, vegetables, fresh or frozen ready to cook meals, and the like.

The containers employed to this end are made of different materials and shapes, depending on the product to be packaged and the specific end-use.

For example, containers made or coated with polyethylene terephthalate (PET), in particular crystalline PET (CPET), which can withstand high temperatures, are especially suitable for the packaging of ready meals, fresh or frozen, that only require heating to be ready for consumption. Heating can be carried out in a microwave or in a conventional oven.

Amorphous PET (APET) containers are commonly used for the packaging of cold food, in particular moist or respiring food products, such as fruits and vegetables.

Another material commonly used for the containers is recycled polyester (RPET).

Lidding films used in this type of packaging are usually polyester films that are heat sealed to the rim or flange of the container. These films have excellent optics and suitable barrier properties and high thermal stability at standard food heating or cooking temperatures. To improve the heat sealability of the lidding films to the container, a heat sealable layer of a lower temperature melting material, may be provided on the relevant portions of the film and/or of the container.

The heat sealable layer of the film may be coextruded with a PET base layer simultaneously through a single die as described, for example, in EP1529797 and WO2007/093495. Alternatively, the heat sealable layer may be solvent- or extrusion-coated over a PET base layer.

The sealing of the lidding film to the container should be sufficiently strong to close the container hermetically, in order to avoid any leakage of material from the container to the exterior as well as any contamination of the product contained in the packaging during storage, handling and distribution. However, when sealed under the conditions needed to obtain the desired hermeticity, many polyester film lids do not open easily or show tearing when peeled off the containers. This results in packages that are not user friendly since they require the use of tools or utensils to open. Furthermore, these packages have the inconvenience that upon tearing residues of the lidding films may fall into the packaged product.

The need is therefore strongly felt to develop polyester based lidding films that, when heat sealed to polyester based containers, show hermeticity and the correct balance in the bonding forces of the different layers so as to provide easy opening properties.

SUMMARY OF INVENTION

The present inventors have now found that in a multilayer polyester film, placing a layer containing ethylene (meth) acrylate/methacrylic acid copolymers, optionally anhydride modified, and/or anhydride modified ethylene alpha olefin copolymers between the polyester heat sealable layer and an inner polyester layer imparts to the film excellent easy opening properties.

The above layers combination allows preparing films having a sealant layer with a composition optimized to obtain high hermeticity when sealed to a polyester based container and at the same time a very easy opening of the package obtained.

In fact, as will be demonstrated in the experimental portion, the films of the invention open easily and with no tearing when sealed hermetically onto APET, CPET or RPET trays.

The specific combination of the above three layers of the film provides an equilibrium of forces that results in a cohesive failure or delamination of the layers when a force is applied to the film to detach it from a substrate. Accordingly, a first object of the present invention is a heat sealable, optionally oriented, coextruded multilayer polyester based film comprising at least the following layers:

1) a heat-sealable polyester based outer layer;
2) an inner layer comprising at least 95%, preferably at least 98 wt %, more preferably at least 99 wt %, even more preferably 100 wt % of a composition consisting of:
   a) between 40 and 100 wt % of one or more polymers selected from ethylene (meth)acrylate/(meth)acrylic acid copolymers, anhydride modified ethylene (meth)acrylate/(meth)acrylic acid copolymers, anhydride modified ethylene alpha olefin copolymers and mixtures thereof,
   b) between 0 and 60 wt % of one or more further polymers selected from polyolefins, ethylene vinyl acetate copolymers (EVA) and mixtures thereof;
3) a polyester based layer;

wherein layer 2 adheres to layer 1 and to layer 3.

A second object of the invention is a package comprising a container, a product placed into the container, and a lid made of the film according to the first object of the present invention, wherein the heat sealable layer of the film faces the product and the film is hermetically sealed onto said container, thus enclosing the product.

A third object of the present invention is the use of the film according to the second object of the invention for packaging food.

Definitions

The term "polyester" is used herein to refer to both homopolyesters and copolyesters.

The term "homopolyesters" refers to polymers obtained from the condensation of one dicarboxylic acid with one diol. Suitable homo-polyester resins are, for instance, polyesters of ethylene glycol and terephthalic acid, i.e. poly (ethylene terephthalate) (PET).

The term "copolyesters" refers to polymers obtained from the condensation of at least one dicarboxylic acid with at least two different diols or at least two different dicarboxylic acids with at least one diol.

The dicarboxylic acid may be aliphatic dicarboxylic acids, among which the (C3-C19)alkanedioic acids are particularly suitable, in particular succinic acid, sebacic acid, adipic acid, azelaic acid, suberic acid or pimelic acid; cycloaliphatic dicarboxylic acids, among which cyclohexanedicarboxylic acids (in particular cyclohexane-1,4-dicarboxylic acid) are preferred; aromatic dicarboxylic acids such as terephthalic acid, isophthalic acid, phthalic acid, naphthalic acid, or 2,5-, 2,6- or 2,7-naphthalenedicarboxylic acid.

Preference is given to polyesters that contain ethylene units and include, based on the dicarboxylate units, at least 90 mol %, more preferably at least 95 mol %, of terephthalate units. The remaining monomer units are selected from other dicarboxylic acids or diols.

The diols may be straight chained or branched. These may be, for example, aliphatic diols such as ethylene glycol, diethylene glycol, triethylene glycol, propylene glycol, 1,3-butane diol, 1,4-butane diol, 1,5-pentane diol, 2,2-dimethyl-1,3-propane diol, neopentyl glycol and 1,6-hexane diol, and cycloaliphatic diols such as 1,4-cyclohexanedimethanol and 1,4-cyclohexane diol, optionally heteroatom-containing diols having one or more rings Examples of suitable copolyesters are (i) copolyesters of azelaic acid and terephthalic acid with an aliphatic glycol, preferably ethylene glycol; (ii) copolyesters of adipic acid and terephthalic acid with an aliphatic glycol, preferably ethylene glycol; and (iii) copolyesters of sebacic acid and terephthalic acid with an aliphatic glycol, preferably butylene glycol; (iv) co-polyesters of ethylene glycol, terephthalic acid and isophthalic acid.

As used herein, the expression "a polyester based film or a polyester based layer" refers to a film or a film layer, respectively, substantially made of polyesters.

As used herein the expression "a film or a layer substantially made of polyesters" refers to a film or film layer made for at least 60%, 70%, 80%, 90% by weight of polyesters, including homopolyesters or copolyesters as previously defined or their admixtures.

As used herein the expression "amorphous" referred to a polyester refers to a polyester with an absence of a regular three-dimensional arrangement of molecules or subunits of molecules extending over distances, which are large relative to atomic dimensions. However, regularity of structure may exist on a local scale (see "Amorphous Polymers" in Encyclopedia of Polymer Science and Engineering, 2ndEd pp 789-842, J. Wiley & Sons Inc 1985). In particular, the term refers to a polyester having no measurable melting point (less than 0.5 cal/g) by differential scanning calorimetry (DSC) or no heat of fusion as measured by DSC using for example ASTM 3417-83. The term also includes polyesters that are obtained and marketed under a (semi)crystalline form but become amorphous after they are heated during extrusion, such as for instance Eastobond 19412 by Eastman Chemical. Suitable amorphous polyesters are those derived from an aliphatic diol and a cycloaliphatic diol with one or more, dicarboxylic acid(s), preferably an aromatic dicarboxylic acid, for example copolyesters of terephthalic acid with an aliphatic diol and a cycloaliphatic diol, especially ethylene glycol and 1,4-cyclohexanedimethanol. The preferred molar ratios of the cycloaliphatic diol to the aliphatic diol are in the range from 10:90 to 60:40, preferably in the range from 20:80 to 40:60, and more preferably from 30:70 to 35:65.

As used herein the expression "(semi)crystalline polyester" refers to a polyester that does not fall within the above definition of amorphous polyester and which has a measurable melting point (measured by DSC using ASTM 3418).

As used herein, the term "polyolefin" is used with reference to any thermoplastic polymer deriving from polymerisation of one or more simple olefins, such as ethylene, propylene and butene. The polymer may be a homopolymer, consisting of repeating units of one single olefin or a co-polymer, consisting of a major proportion of one olefin and a minor proportion of one or more other olefins co-polymerisable therewith.

The term polyolefin specifically includes ethylene homo-e copolymers, butene homo-e co-polymers, propylene homo-e co-polymers and the like.

As used herein the terms "ethylene alpha olefin copolymer" identify copolymers of ethylene, comprising a major portion of ethylene and a minor proportion of one or more alpha-olefins comonomers, preferably (C4-C10) alpha-olefins, such as 1-butene, 1-hexene and/or 1-octene. Depending on the composition in monomers and polymerization process employed, polymers with a different degree of branching and a different density can be obtained. For example, the above terms include polymers such as linear low density polyethylene (LLDPE) with a density usually in the range of from about 0.900 glee to about 0.930 glee, linear medium density polyethylene (LMDPE) with a density usually in the range of from about 0.930 glee to about 0.945 glee, and very low and ultra low density polyethylene (VLDPE and ULDPE) with a density lower than about 0.915 glee, typically in the range 0.868 to 0.915 glee.

As used herein, the term "ethylene (meth)acrylate/(meth) acrylic acid copolymer" refers to a copolymer of ethylene with (meth)acrylate esters or (meth)acrylic acid.

As used herein, the term "copolymer of ethylene with (meth)acrylate esters" refers to a copolymer of ethylene with methacrylate or acrylate esters.

For example, the term includes ethylene ethyl (meth) acrylate co-polymer, ethylene-butyl (meth)acrylate co-polymer, ethylene methyl(meth)acrylate co-polymer and the like. The copolymer typically contains between 15 to 40%, preferably about 20% by weight of acrylate or methacrylate units.

As used herein, the term "copolymer of ethylene with (meth)acrylic acid" refers to a copolymer of ethylene with acrylic or methacrylic acid.

As used herein, the term "propylene copolymer" refers to propylene co- or ter-polymers comprising a major portion of propylene and a minor proportion of one or more alpha-olefins comonomers, such as ethylene or butene. The term specifically includes propylene/ethylene and propylene/ethylene/butene copolymers.

As used herein the term "polybutene" refers to homopolymers or co-polymers of butene.

As used herein, the term "ethylene-vinyl acetate copolymer" or "EVA" refers to a copolymer formed from ethylene and vinyl acetate monomers or ethylene, vinyl acetate and carbon monoxide monomers, wherein the ethylene derived units in the copolymer are present in major amounts; preferably between about 60% and 98% by weight and the vinyl acetate and monoxide derived units in the copolymer are present in minor amounts, preferably between about 2% and about 40% by weight.

As used herein the term "anhydride modified ethylene alpha olefin copolymer" or "anhydride modified ethylene methylacrylate copolymer" refers to such polymers having an anhydride functionality associated therewith, either grafted onto the polymer or copolymerised therewith. The anhydride functionality can be an anhydride of maleic acid, crotonic acid, citraconic acid, itaconic acid, fumaric acid, etc., and is inclusive of derivatives of such functionalities, such as acids, esters, and metal salts derived therefrom.

As used herein the term "ionomer" or "neutralized" referred to an ethylene (meth)acrylic acid copolymer refers to an ethylene (meth)acrylic acid copolymer, partially neutralized with a mono or divalent metal ion, such as zinc, lithium, sodium, potassium, calcium and magnesium. Commercially available resins of this kind are Surlyn by Dupont.

As used herein, the expression "heat sealable layer", refer to the outer layer of the film involved in the heat sealing of the film to a container, as herein defined.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextruded film" refers to a film obtained by coextrusion. The term "coextrusion" refers to the process of extruding two or more molten thermoplastic materials through a single die with two or more orifices arranged so that the extrudates merge and weld together into a laminar structure before chilling, i.e., quenching.

As used herein, the term "easy opening package" refers to a package made of a lidding film heat sealed to a container, wherein the seal between the lidding film and the container is strong enough to guarantee hermeticity of the package during its life-cycle but allows opening of the package manually by applying a force to separate the lid from the tray. The opening of the package may occur by a cohesive failure within one layer of the lidding film induced by the force applied or by delamination of one layer of the film from the adjacent one. As used herein, "cohesive failure" means that, upon application of a force to separate the lidding film from the container, the film detaches from the container to which it is sealed as a result of a breakage occurring internally in one of the layers of the film. Typically, the breakage occurs within the sealant layer, within the layer adjacent to the sealant or within another inner layer of the film. Both in the cohesive failure and in the delamination mechanism, a part of the lidding film, comprising the sealant layer of the film, remains attached to the container. As used therein "easy opening film" refers to a film that forms an easy opening seal when sealed as a lid onto a container.

As used herein, the term "adheres", as applied to layers, refers to adhesion of the subject layer to the object layer by direct contact with each other, without a tie layer, an adhesive, or other layer therebetween.

As used herein, the term "container" refers to any hollow rigid object suitable for supporting and containing a product, preferably a tray. The container is optionally provided with a sealing area, such as a sealing flange, suitable for being sealed to the heat sealable layer of the film of the present invention.

As used herein, the term "lidding film" refers to a film that closes the opening of a rigid container.

As used herein, the phrases "corona treatment" and "corona discharge treatment" refer to subjecting one or both the outer surfaces of the film to a corona discharge treatment, i.e., the ionization of a gas such as air in close proximity to a film surface, the ionization initiated by a high voltage passed through a nearby electrode, and causing oxidation and other changes to the film surface, such as surface roughness. Corona treatment of polymeric materials is disclosed in e.g. U.S. Pat. No. 4,120,716.

As used herein, the phrases "orientation" refers to the "solid state orientation", namely to the process of stretching of the cast film carried out at a temperature higher than the Tg (glass transition temperatures) of all the resins making up the layers of the structure and lower than the temperature at which all the layers of the structure are in the molten state.

The solid state orientation may be mono-axial, transverse or, preferably, longitudinal, or, preferably, bi-axial.

The phrase "orientation ratio in machine or longitudinal direction" refers to the number of times the film has been oriented in that direction in relation to its original size. For example, if a film has been oriented to three times its original size in the longitudinal direction, the orientation ration in longitudinal direction is 3:1.

As used herein the phrases "heat-shrinkable," "heat-shrink," and the like, refer to the tendency of the solid-state oriented film to shrink upon the application of heat, such that the size of the film decreases while the film is in an unrestrained state.

As used herein, the phrase "longitudinal direction", refer to a direction "along the length" of the film, i.e., in the direction of the film as the film is formed during coextrusion.

As used herein, the phrase "transverse direction", refers to a direction across the film, perpendicular to the machine or longitudinal direction.

As used herein, the term "layer" refers to a single layer of the film, having a substantially homogenous polymeric composition within it.

DETAILED DESCRIPTION OF INVENTION

A first object of the present invention is a heat sealable, optionally oriented, coextruded multilayer polyester based film comprising at least the following layers:
1) a heat-sealable polyester based outer layer;
2) an inner layer comprising at least 95 wt %, preferably at least 98 wt %, more preferably at least 99 wt %, even more preferably 100 wt % of a composition consisting of:
  a) between 40 and 100 wt % of one or more polymers selected from ethylene (meth)acrylate/(meth)acrylic acid copolymers, anhydride modified ethylene (meth)acrylate/(meth)acrylic acid copolymers, anhydride modified ethylene alpha olefin copolymers and mixtures thereof,
  b) between 0 and 60 wt % of one or more further polymers selected from polyolefins, ethylene vinyl acetate copolymers (EVA) and mixtures thereof;
3) a polyester based layer;
wherein layer 2 adheres to layer 1 and layer 3.

Preferably, the overall composition of the film of the invention comprises at least 60 wt %, preferably at least 70 wt %, even more preferably at least 80 wt % of polyesters.

Preferably, said polyesters are polyesters of aromatic dicarboxylic acids, more preferably of terephthalic acid.

The film of the invention may have 3 or more layers, preferably between 3 and 10, more preferably between 3 and 6, even more preferably 3 or 4.

The total thickness of the film of the invention may vary within wide limits. It is preferably between 3 and 100 microns, preferably between 5 and 80 microns, more preferably between 8 and 70 microns, more preferably between 15 between 50 microns, more preferably between 20 and 40 microns, even more preferably between 25 and 35 microns.

Preferably, the heat sealable layer 1) has a thickness comprised between 0.5 and 15 microns, preferably between 1 and 10 microns, more preferably between 2 and 8 microns.

Preferably, layer 2) has a thickness comprised between 2 and 30 microns, preferably between 3 and 20 microns, more preferably between 4 and 10 microns, even more preferably between 4 and 8 microns.

Preferably, layer 3) has a thickness comprised between 5 and 60 microns, more preferably between 8 and 40 microns, more preferably between 10 and 20 microns, even more preferably between 12 and 18 microns.

The film according to the invention may be heat shrinkable or not, preferably it is heat shrinkable. A heat shrinkable film according to the invention has a percentage of free shrink at 120° C. of at least 1%, 5%, 10%, 15% in longitudinal and/or transverse direction, measured in oil according to ASTM D 2732.

When the film of the invention is oriented, it is preferably biaxially oriented, with an orientation ratio preferably comprised between about 2:1 and about 5:1, more preferably between 2:1 and about 4:1, even more preferably of 3.6:1 in both longitudinal and transverse direction.

In the film of the invention, the above said composition of layer 2), which constitutes at least 95 wt % of the composition of the layer, preferably comprises an amount of at least 45 wt %, preferably at least 50 wt %, more preferably at least 60 wt %, more preferably at least 70 wt % of one or more polymers selected from ethylene (meth)acrylate/(meth)acrylic acid copolymers, anhydride modified ethylene (meth)acrylate/(meth)acrylic acid copolymers and anhydride modified ethylene alpha olefin copolymers.

According to one preferred embodiment, the above said composition of layer 2) consists of 100 wt % of one or more polymers selected from ethylene (meth)acrylate/(meth)acrylic acid copolymers, anhydride modified ethylene (meth)acrylate/(meth)acrylic acid copolymers and anhydride modified ethylene alpha olefin copolymers.

According to an alternative preferred embodiment, the above said composition of layer 2) consists of an amount between 40 and 99 wt %, more preferably between 50 and 90 wt %, more preferably between 50 and 80 wt %, more preferably between 65 and 75 wt %, even more preferably of 70 wt % of one or more polymers selected from ethylene (meth)acrylate/(meth)acrylic acid copolymers, anhydride modified ethylene (meth)acrylate/(meth)acrylic acid copolymers, anhydride modified ethylene alpha olefin copolymers and an amount between 1 and 60 wt %, preferably between 10 and 50 wt %, more preferably between 20 and 50 wt %, more preferably between 25 and 35 wt %, even more preferably of 30 wt % of one or more polymers selected from polyolefins and ethylene vinyl acetate copolymers (EVA) and mixtures thereof.

Preferably, according to this embodiment, layer 2) does not contain anhydride modified ethylene alpha olefin copolymers in combination with polyolefins.

A preferred composition according to this embodiment consists of an amount between 60 and 90 wt %, preferably between 65 and 85 wt % of one polymer selected from ethylene (meth)acrylate/(meth)acrylic acid copolymers, anhydride modified ethylene (meth)acrylate/(meth)acrylic acid copolymers, and between 10 and 40 wt %, preferably between 35 wt % and 15 wt % of one polymer selected from polyolefins, preferably a propylene copolymer, polybutene or a linear low density polyethylene, and ethylene vinyl acetate copolymers. Another preferred composition according to this embodiment consists in between 45 and 65 wt % of ethylene (meth)acrylate/(meth)acrylic acid copolymers and between 35 and 55 wt % of a mixture of polybutene and an ethylene vinyl acetate copolymer.

Preferably, in the composition of layer 2), said ethylene (meth)acrylate copolymers are selected from ethylene $C_1$-$C_4$ alkyl (meth)acrylate copolymers, more preferably from ethylene methyl (meth)acrylate copolymers, ethylene ethyl (meth)acrylate copolymers and ethylene-butyl (meth)acrylate copolymers, even more preferably are ethylene methylacrylate copolymers.

Preferably said ethylene methylacrylate copolymer comprises between 5 and 40 wt %, preferably between 8 and 25 wt % methyl acrylate. This embodiment results in improved easy opening properties compared to other (meth)acrylate/(meth)acrylic acids.

A suitable ethylene methylacrylate copolymer is for example Elvaloy 1820 AC or Elvaloy AC 1609 commercialized by DuPont, Lotryl Bestpeel 2012 or Lotryl XX1338 commercialized by Arkema.

Preferably, in the composition of layer 2), said ethylene (meth)acrylic acid copolymers may be in form of ionomers, preferably Zinc ionomers.

Preferably, in the composition of layer 2), said anhydride modified ethylene (meth)acrylate/(meth)acrylic acid copolymers are maleic anhydride modified ethylene (meth)acrylate/(meth)acrylic acid copolymers. Preferably, said anhydride modified ethylene (meth)acrylate/(meth)acrylic acid copolymers are anhydride modified ethylene methylacrylate copolymers.

A suitable anhydride modified ethylene methylacrylate copolymer is for example Bynel 21E533, Bynel 21E830 or Bynel CM 21E787 by DuPont.

Preferably, in the composition of layer 2), said anhydride modified ethylene alpha olefin copolymers are maleic anhydride modified ethylene alpha olefin copolymers. Preferably, said ethylene alpha olefin copolymers are ethylene ($C_4$-$C_{10}$) alpha olefin copolymers, more preferably ethylene octane copolymers and/or is linear low density polyethylene (LLDPE). More preferably, said anhydride modified ethylene alpha olefin copolymers are maleic anhydride modified linear low density polyethylene.

Suitable maleic anhydride modified linear low density polyethylenes are for example ADMER NF927E, ADMER NF911E, ADMER NF912E or ADMER NF518E by Mitsui Chemical or Bynel 4104 by DuPont.

Preferably, in the composition of layer 2), said polyolefins are selected from propylene copolymers, among which preferably propylene/ethylene/butene copolymers and propylene/ethylene copolymers, polybutenes and ethylene alfa olefin copolymers, preferably ethylene $C_4$-$C_{10}$ alpha olefin copolymers, more preferably linear low density polyethylenes.

Suitable polyolefins for use in layer 2) are the products commercialized under the tradename Eltex PP KS350 by Ineos, VERSIFY 3000 or Dowlex 2045S by Dow, Polybutene-1 PB 8640M by LyondellBasel Industries. Preferably, in the composition of layer 2), said ethylene vinyl acetate copolymers (EVA) are ethylene/vinyl acetate/carbon monoxide copolymers, preferably with a comonomer content between 20 and 30 wt %, more preferably of 24%.

A suitable ethylene vinyl acetate copolymer for use in layer 2 of the invention is the product commercialized under the tradename Elavloy 741 by DuPont.

In addition to the above composition, layer 2 may contain up to 5% of additional components, such as for example inorganic additive compounds.

In the film of the invention, the composition of the heat sealable layer 1) may be any polyester based composition known in the art suitable for obtaining a hermetic package when heat sealed to a polyester container.

According to the invention, a hermetic package is obtained when the Dopack value for the package, measured as described in the experimental section, is at least 0.25, more preferably at least 0.30, even more preferably at least 0.40.

Preferably, the heat sealable layer 1) comprises at least 90 wt %, more preferably at least 95 wt %, more preferably at least 98 wt %, even more preferably 100 wt % of one or more polyesters.

Preferably, said polyesters are polyesters of aromatic dicarboxylic acids, more preferably of terephthalic acid.

Preferably, said polyesters comprise at least 50 wt %, 60 wt %, 70 wt %, 80 wt %, 90 wt %, 95 wt %, 100 wt % of amorphous polyesters.

Preferably, said polyesters are copolyesters, more preferably poly(ethylene terephthalate) copolymers.

Preferably, the heat-sealable layer 1) has a composition that provides a seal initiating temperature comprised between 110° C. and 150° C., more preferably between 110° C. and 130° C.

For example, suitable copolyesters for use in layer 1) of the film of the invention are Eastabond 19412, GN001 or Eastar 6763 C0235 by Eastman Chemical or Vitel 1916NSB-p by Eastman Chemical.

According to a particularly preferred embodiment, the heat-sealable layer 1) comprises at least two different polyesters, preferably copolyesters, having glass transition temperatures that differ of at least 15° C. More preferably, according to this embodiment, said heat-sealable layer composition comprises:
  a) between 80 and 97 wt % of at least one polyester a), preferably a copolyester, more preferably a poly(ethylene terephthalate) copolymer, having a glass transition temperature T(g) between 40 and 60° C.;
  b) between 3 and 20 wt % of at least one polyester b), preferably a copolyester, more preferably a poly(ethylene terephthalate) copolymer, having a glass transition temperature T(g) between 65 and 90° C.;
wherein polyester b) has a glass transition temperature at least 15° C. higher than the glass transition temperature of polyester a), and components a) and b) are present in the composition in a total amount of at least 90 wt %.

A suitable polyester a) according to this embodiment of the invention is for example Eastobond 19412, commercialized by Eastman Chemical. A suitable polyester b) according to this embodiment of the invention is for example the product GN001, commercialized by Eastman Chemical.

Preferably, in the film according to the invention, the outer layer of the film, opposite to the heat sealable layer 1), comprises at least 90 wt %, preferably at least 95 wt %, more preferably at least 98 wt %, even more preferably 100 wt % of polyesters.

Preferably, said polyesters are polyesters of aromatic dicarboxylic acids, more preferably of terephthalic acid.

Preferably said polyesters comprise at least 80 wt % of (semi)crystalline polyesters, preferably consist of an amount between 90 wt % and 100 wt %, preferably between 95 wt % and 99 wt %, even more preferably 98 wt % of (semi)crystalline polyesters and an amount between 0 and 10 wt %, more preferably between 1 and 5 wt %, even more preferably 2 wt % of amorphous polyesters.

Preferably, said polyesters are copolyesters, more preferably poly(ethylene terephthalate) copolymers.

According to one preferred embodiment of the present invention, the film has only three layers and layer 3) of the film corresponds to the outer layer of the film (outer layer 3), preferably having the composition as described above.

According to an alternative preferred embodiment of the present invention, the film has more than 3 layers, more preferably 4.

In a film according to this embodiment, the outer layer of the film is a further d layer 4) of the film, which is preferably polyester based.

In a film according to this embodiment, layer 3) is an inner layer of the film (inner layer 3) and preferably comprises at least 90 wt %, preferably at least 95 wt %, more preferably at least 98 wt %, even more preferably 100 wt % of one or more polyesters.

Preferably, said polyesters are polyesters of aromatic dicarboxylic acids, more preferably of terephthalic acid.

Preferably, said polyesters consist of an amount between 50 wt % and 100 wt % if (semi)crystalline polyesters and an amount between 0 and 50 wt % of amorphous polyesters.

Preferably, said polyesters are copolyesters, more preferably poly(ethylene terephthalate) copolymers.

According to a particularly preferred embodiment, layer 3) comprises an amount of at least 50 wt %, more preferably between 50 and 80 wt %, even more preferably between 55 wt % and 70 wt %, even more preferably about 60 wt % of (semi)crystalline polyesters and an amount between 20 and 50 wt %, more preferably between 30 and 45 wt %, even more preferably of about 40 wt % of amorphous polyesters.

According to an alternative preferred embodiment, said polyesters contain 100% of amorphous polyesters.

A suitable amorphous copolyester for use in the inner layer 3) of the invention for example the product commercialized under the tradename GN001 by Eastman Chemical.

A suitable amorphous copolyester for use in the outer layer of the film of the invention is for example the product commercialized under the tradename Sukano G dc S503 by Sukano.

A suitable (semi)crystalline polyester for use in inner layers 3) or in the outer layer of the film of the invention is for example the product commercialized under the tradename Rampanet N180 by Eastman Chemical.

Preferably, in order to improve the processing of the film in a high speed packaging equipment, slip and/or antiblocking additives may be added to one or both of the outer layers. These additives may be added in the form of a concentrate in a polyester carrier resin. The amount of carrier is typically in the order of 0.1-5% of the total weight of the layer.

As will be demonstrated in the experimental section, the film according to this embodiment when sealed onto polyester containers shows hermeticity and easy opening properties. In particular, the lidding film opens from the container by means a cohesive failure or delamination within the film without tearing or producing angel hairs. In particular, the inventors have observed that the film of the invention, when subjected to pulling in order to detach it from the tray, shows a cohesive failure preferably within the second layer or delamination between the first and second layer or second and third layer, followed by a breakage of the structure of the film and detaching of the film from the container.

The above opening mechanisms may particularly advantageous when the composition of the films is such as to leave a visible white residue on the flange of the container, which serves as evidence of hermeticity and lack of tampering of food or medical product packages.

Furthermore, the film of the invention have good optical properties.

The film according to the first object of the present invention may be manufactured by processes well known in the art such as flat or round co-extrusion, optionally followed by mono- or bi-orientation, performed by flat, sequential or simultaneous tenterframe orientation or by trapped bubble orientation on Double or Triple Bubble lines, respectively.

Preferably, coextrusion is carried out by means well known in the art, for example using a flat or a circular film die that allows shaping the polymer melt into a flat tape or a film tubing, wherein each of the blends of the different layers of the film are extruded simultaneously through the extrusion die.

The film of the present invention, co-extruded as described above, is, optionally oriented through a round or flat film orientation process that produces a monoaxially, preferably biaxially oriented film.

In details, in case the multilayer film is co-extruded through a circular extrusion die, the tube of molten polymers so obtained is quenched immediately after extrusion without being expanded, optionally cross-linked, then heated to a temperature which is above the Tg of all the resins employed and below the melting temperature of at least one of the resins employed, typically by passing it through a hot water bath or heating it with an IR oven or with hot air, and expanded, still at this temperature by internal air pressure to get the transverse orientation and by a differential speed of the pinch rolls which hold the thus obtained "trapped bubble" to provide the machine or longitudinal orientation. An example of equipment suitable for this technique is disclosed by U.S. Pat. No. 4,841,605.

Otherwise, the multilayer film according to the present invention may be obtained by flat coextrusion through a slot die, followed by optional orientation by heating the tape to its softening temperature but below its melt temperature and by stretching in the solid state with a simultaneous or a sequential tenterframe process. The film is then rapidly cooled to somehow freeze the molecules of the film in their oriented state and wound. Furthermore, in some instances it may be desirable to submit the oriented structure to a controlled heating-cooling treatment, so-called annealing, that is aimed at having a better control on low temperature dimensional stability of the film.

In case of oriented films, while orientation is typically carried out in both machine and transverse directions, mono-oriented films or films preferentially/exclusively oriented in one direction can be obtained by controlling/avoiding transverse or machine orientation.

Typical heat setting temperatures for the present films range from 120° C. to 220° C., preferably between 140° C. and 170° C., more preferably at 158° C.

The film according to the present invention can also optionally comprise an antifog agent coated onto at least the surface of the heat sealable layer 1) of the film, which is directly facing the product in the container, so as to obtain an antifogging surface. Suitable antifog agents for this application method can be selected from non-ionic surfactants such as polyhydric alcohol fatty acid esters, higher fatty acid amines, higher fatty acid amides, polyoxyethylene ethers of higher fatty alcohols and ethylene oxide adducts of higher fatty acid amines or amides. Preferred antifog agents are ethoxylated sorbitan derivatives with higher fatty acids such as those marketed under the trade name of Tweens or Polysorbates, preferably with fatty acids from C14 to C24, for example Atmer 116 commercialized by Croda.

The application of the antifog agent may be carried out either by an in-line method involving application during the manufacture or by an off-line method involving the application after the manufacture of the film. The antifog agent may be added in an amount of from about 40 mg/sqm to 140 mg/sqm, preferably from about 80 mg/sqm to 120 mg/sqm, more preferably of 100 mg/sqm.

The surface of the heat sealable layer of the film may be corona treated before applying the coating.

The coating composition may be applied to the film by any suitable conventional technique, well known in the art, such as for example digital printing, roller printing, flexography, slot die, rotogravure, vapour deposition, or by blade, brush or scraper, or by spraying or pouring.

A second object of the present invention is a package comprising a container, preferably a tray, a product placed into said container and a lid made of the film according to the first object of the present invention sealed onto said container, thus enclosing the product, wherein the heat sealing layer of the film is in contact with or faces the product. The container may be any container that forms a seal with the film of the invention. Typically, the surface of the container involved in the formation of the seal with the film of the invention comprises a polyester resin, preferably an amorphous polyester resin (APET). For example, containers can be made of cardboard coated with polyester or can be integrally made of a polyester resin. Examples of suitable polyester containers for the package of the invention are CPET, APET, APET/CPET and RPET containers.

The package is produced by techniques well known to those skilled in the art.

For example, once the food to be packaged has been introduced into the container, for example a tray, the film according to the invention is placed on the container such that the heat sealable surface is in contact with the surface of the rim or the peripheral lip/flange of the container and sealed to the container by means of temperature using conventional techniques and equipment. Sealing is carried out by means of a heated frame at temperatures of from 100° C. to 180° C., preferably from 110° C. to 150° C., more preferably from 120° C. to 140° C., at a pressure of 2 to 10 bar, 4 to 8 bar. Sealing times are typically in the order of 0.3 to 2.0 seconds, 0.5 to 1.0 seconds.

For example, the container with the product loaded therein is brought into a lid sealing station, which comprises a lower chamber and an upper chamber, and a web of the film of the invention is provided over the top of the container. The lower chamber and the upper chamber are then closed together, the air in-between the support and the lidding film is replaced by the suitable gas or gas admixture, with or without prior air evacuation, and then the lidding film of the invention is sealed to the rim or the peripheral lip of the container by means of the combination of a heated frame or platen above the lidding film and a similarly framed anvil supporting the container rim or peripheral lip, that are pressed together. The lidding film is cut almost at the same time as the lid is sealed and, in case of shrinkable lids, shrinkage of the lid in the package typically occurs at the same time as the heat of the sealing elements in the lidding station is sufficient to get the desired shrinkage. Lidding machines that can be suitable for tray lidding process include for instance Multivac 400 and Multivac T550 by Multivac Sep. GmbH, Mondini Trave, E380, E390 or E590 by Mondini S.p.A., Ross A20 or Ross S45 by Ross-Reiser, Mecaplastic 1000, Meca-2002 or Meca-2003 by Mecaplastic, the tray lidding machines of Sealpac and the like machines.

As will be demonstrated in the experimental section, the films of the present invention have the advantage that they allow to obtain a hermetically sealed package that it is easy to open.

The package is particularly suitable to be used for moist or respiring products such as fruits and vegetables or "ready meals".

A third object of the present invention is the use of the film according to the first object of the invention for packaging food, preferably ready meals for cooking applications (either in microwave oven or in conventional oven), or moist or respiring products, such as fruits and vegetables or for packaging medical equipment.

EXAMPLES

The present invention can be further understood by reference to the following examples that are merely illustrative and are not to be interpreted as a limitation to the scope of the claims.

Example 1—Preparation of Films

In the following films, the polymers and compositions indicated in Table 1 below were used.

TABLE 1

| Polymers and compositions | | |
|---|---|---|
| TRADENAME | SUPPLIER | ACRONYM |
| Eastobond 19412 | Eastman Chemical | PET1 |
| RAMAPET N180 | Indorama | PET2 |
| GN001 | Eastman Chemical | PETG1 |
| SUKANO G dc S503 | Sukano | PETG2(slip) |
| EASTAR 6763 C0235 | Eastman Chemical | PETG3(antiblock) |
| Elvaloy 1820 AC | DuPont | EMA1 |
| Lotryl bestpeel 2012 | Arkema | EMA2 |
| ELVALOY 741 | DuPont | EVA |
| Eltex P KS350 | Ineos | PP-ter |
| VERSIFY 3000 | DOW | EPC |
| Polybutene-1 PB 8640M | LyondellBasell Industries | PB |
| DOWLEX 2045S | DOW | LLDPE |
| ATMER 116 | Croda | Antifog Additive |
| ACETATO ETILE | Rabbi solved | EtAc |
| Vite11916NSB-p | Bostik | PETG4 |
| Elvaloy 2615 | DuPont | EEA1 |
| Nucrel 0908 HS | DuPont | EAA1 |
| Surlyn 1652-E | DuPont | EMAA-Zn1 |
| Elvaloy AC 3717 | DuPont | EBA1 |
| Bormed TD109CF | Borealis | EPC1 |
| Lotryl XX1338 | Arkema | EMA3 |
| ADMER NF927E | Mitsui Chemical | LLDPE-md1 |
| Bynel 21E830 | DuPont | EMA-md1 |
| ELVALOY AC 1218 | DuPont | EMA4 |
| ADMER NF518E | Mitsui Chemical | LLDPE-md2 |
| BYNEL CXA 21E787 | DuPont | EMA-md2 |
| BYNEL 4104 | DuPont | LLDPE-md3 |

TABLE 1-continued

| Polymers and compositions | | |
|---|---|---|
| TRADENAME | SUPPLIER | ACRONYM |
| ADMER NF911E | Mitsui Chemical | LLDPE-md4 |
| BYNEL 21E533 | DuPont | EMA-md3 |
| Elvaloy AC 1609 | DuPont | EMA5 |

PET1: Polyester, copolymer of polyethylene terephthalate -Density 1.33 g/cc, Viscosity Intrinsic 0.74 dl/g;

PET2: Polyester, copolymer of terephthalic acid, isophthalic acid and mono-ethylene glycol - Bulk (Apparent) Density 0.830 g/cc, Density 1.4 g/cc, Glass Transition 78° C., Melting point 245° C., Viscosity Solution 0.80 mPa · sec;

PETG1: Polyethylene Terephthalate/Glycol - Density 1.27 g/cc, Glass Transition 78° C., Viscosity Intrinsic 0.75 dl/g;

PETG2(slip): AntiBlock and Slip in Polyethylene Terephthalate/Glycol, Amorphous Silica and Ester Wax - Additives(SiO2) 10%, Additives(Wax) 6%, Bulk (Apparent) Density 0.74 g/cc, Density 1.4 g/cc, Moisture Content Max 0.5 %, Vicat softening point 82° C.;

PETG3(antiblock): Polyethylene Terephthalate/Glycol - Ash 10 % - Density 1.29 g/cc;

PETG4: Copolyester -Density 1.3 g/cc, Melt Flow Rate(200° C./2.16 kg) 30 g/10 min. Melting point 145° C., Moisture Content 0.03%, Viscosity Solution 0.84 mPa · sec;

EMA1: Copolymer of ethylene and methyl acrylate with 20% methyl acrylate comonomer content. Density 0.942 g/cc, Melt Flow Rate (190° C./02.16 kg) 8 g/10 min, Melting Point 92° C., Vicat Softening Point 54° C.;

EMA2: Copolymer of ethylene and methyl acrylate with 20% methyl acrylate comonomer content- Melt Flow Rate (190° C./02.16 kg) 12 g/10 min, Melting point 80° C.;

EMA3: Copolymer of ethylene and methyl acrylate with Antiblock additive, with 18%-22% methyl acrylate comonomer content- Density 1.40 g/cc, Melt Flow Rate (190° C./2.16) 8 g/10 min EMA4: Copolymer of ethylene and methyl acrylate with 18% methyl acrylate comonomer content- Density 0.940 g/cc, Melt Flow Rate (190° C./2.16) 2 g/10 min. Melting point 94° C., Vicat softening point 60° C.;

EMA5: Copolymer of ethylene and methyl acrylate with 9% methyl acrylate comonomer content- Melt Flow Rate (190° C./2.16 Kg) 6 g/10 min, density 0.93 g/c;

EMA-md1: Copolymer of ethylene and methyl acrylate, anhydride modified- Density 0.946 g/cc, Melt Flow Rate (190° C./2.16) 7.50 g/10 min, Melting point 93° C.;

EMA-md2: Copolymer of ethylene and methyl acrylate, anhydride modified- Density 0.930 g/cc, Melt Flow Rate (190° C. 102.16 kg) 1.6 g/10 min, Melting point 92° C., Vicat softening point 52° C.;

EMA-md3: Copolymer of ethylene and methyl acrylate, anhydride modified- Density 0.940 g/cc, Melt Flow Rate (190° C./02.16 kg) 7.7 g/10 min, Melting point 83° C., Vicat softening point 50° C.;

EEA1: Copolymer of ethylene and ethyl acrylate with 15% ethyl acrylate comonomer content- Density 0.93 g/cc, Melt Flow Rate (190° C. 12.16 kg) 6 g/10 min, Melting point 97° C.;

EAA1: Copolymer of ethylene and methacrylic acid, with 9% methacrylic acid- Density 0.93 g/cc, Melt Flow Rate (200° C./2.16 kg) 8 g/10 min;

EMAA-Zn1: Zinc ionomer of ethylene methacrylic acid copolymer- Density 0.94 g/cc, 5.2 g/10 min, Melting point 97° C., Vicat Softening Point 79° C.;

EBA1: Copolymer of ethylene and butyl acrylate, with 17% butyl acrylate comonomer content- Density 0.924 g/cc, Melt Flow Rate (190° C./2.16 kg) 7 g/10 min, Melting Point 96° C., Vicat Softening Point 55° C.;

EVA: Ethylene/vinyl acetate/carbon monoxide (E/VA/CO) copolymer with 24% comonomer content. Acid Number 35 mg KOH/g, Comonomer content 24%, Density 1 g/cc, Melting point 66.00° C.. Number 50 No./g;

EPC: Polypropylene copolymer, Propylene/Ethylene copolymer single site, Comonomer content ethylene 5.2%- Density 0.891 g/cc, Glass Transition −14° C., Melt Flow Rate (230X/02.16 kg) 8.0 g/10 min, Melting point 108° C., Vicat softening point 105° C.;

EPC1: Polypropylene alpha olefin copolymer -Density 0.9 g/cc, Melt Flow Rate (230° C./2.16 kg) 6 g/10 min, Melting point 131° C.;

PP-ter: Propylene/Ethylene/Butene copolymer with anti-block and slip additives. Density 0.895 g/cc, Melt Flow Rate (230° C./02.16 kg) 5 g/10 min, Melting point 131° C., Vicat softening point 105° C.;

LLDPE: Polyethylene, Linear Low Density Ethylene/Octene Copolymer (linear, Ziegler/Natta) - Density 0.9200 g/cc, Melt Flow Rate (190° C./02.16 kg).1.00 g/10 min, Melting point 124.0° C., Number Pellets 40 No./g,Vicat softening point 103° C.;

LLDPE-md1: Maleic anhydride grafted polyethylene- Acid Number 108 mg KOH/g, Density 0.915 g/cc. Gel Content 108 No.,Melt Flow Rate (190° C./02.16 kg) 1.3 g/10 min, Vicat softening point 72° C.;

LLDPE-md2: Maleic andhydride grafted polyethylene, linear low density- Density 0.91 g/cc, Melt Flow Rate (190° C./2.16 kg) 3.1 g/10 min, Melting point 118° C., Volatile Content Max 0.2 %;

LLDPE-md3: anhydride-modified, linear low-density polyethylene- Density 0.9300 g/cc, Melt Flow Rate (190° C./02.16 kg) 1.10 g/10 min, Melting point 125.0° C., Vicat softening point 110° C.;

LLDPE-md4: anhydride-modified, linear low-density polyethylene- Density 0.90 g/cc, Melt Flow Rate (190° C./02.16 kg) 2.5 g/10 min, Melting point 97° C., Vicat softening point 74° C.: Antifog additive: Ethoxylated Sorbitan Fatty acid ester-Polysorbate 80- Acid Number Max 2 mg KOH/g, Density Min 1.06 Max 1.08 g/cc, Viscosity Min 375 max 480 mPa · sec;

EtAc: Ethyl acetate- Boiling Point Range 76.5° C., Density 0.9 g/cc, Volatile Content 99.998%;

PB: Polybutene- Density 0.906 g/cc, Melt Flow Rate (200° C./02.16 kg) 10.0 g/10, Melt Flow Rate (190° C./2.16 kg).1.g/10 min, Melting point 97° C..

Films 1-39 and comparative film C1 having the structure and composition set out in Table 2 were prepared (all percentages are expressed in weight).

TABLE 2

| Film n. | Layer | Layer composition | Layer thickness (microns) | Film thickness (microns) |
|---|---|---|---|---|
| 1 | 1 | 90% PET1 10% PETG1 | 5 | 30 |
|  | 2 | 100% EMA1 | 6 |  |
|  | 3 | 100% PETG1 | 14 |  |
|  | 4 | 98% PET2 2% PETG2(slip) | 5 |  |
| 2 | 1 | 90% PET1 10% PETG1 | 5 | 30 |
|  | 2 | 70% EMA1 30% EVA | 6 |  |
|  | 3 | 100% PETG1 | 14 |  |
|  | 4 | 98% PET2 2% PETG2(slip) | 5 |  |
| 3 | 1 | 99.3% PETG1 0.7% PETG3(antiblock) | 2 | 30 |
|  | 2 | 70% EMA1 30% EMA2 | 6 |  |
|  | 3 | 100% PETG1 | 16 |  |
|  | 4 | 98% PET2 2% PETG2(slip) | 6 |  |
| 4 | 1 | 90% PET1 10% PETG1 | 5 | 30 |
|  | 2 | 70% EMA1 30% PP-ter | 6 |  |
|  | 3 | 100% PETG1 | 14 |  |
|  | 4 | 98% PET2 2% PETG2(slip) | 5 |  |
| 5 | 1 | 90% PET1 10% PETG1 | 5 | 30 |
|  | 2 | 51% EMA1 19% EVA 30% PB | 6 |  |
|  | 3 | 100% PETG1 | 14 |  |
|  | 4 | 98% PET2 2% PETG2(slip) | 5 |  |
| 6 | 1 | 90% PET1 10% PETG1 | 5 | 30 |
|  | 2 | 70% EMA1 30% PB | 6 |  |
|  | 3 | 100% PETG1 | 14 |  |
|  | 4 | 98% PET2 2% PETG2(slip) | 5 |  |
| 7 | 1 | 99.3% PETG1 0.70% PETG3(antiblock) | 5 | 30 |
|  | 2 | 70% EMA1 30% PP-ter | 6 |  |
|  | 3 | 100% PETG1 | 14 |  |
|  | 4 | 98% PET2 2% PETG2(slip) | 5 |  |
| 8 | 1 | 90% PET1 10% PETG1 | 5 | 30 |
|  | 2 | 70% EMA1 30% EPC | 6 |  |
|  | 3 | 100% PETG1 | 14 |  |
|  | 4 | 98% PET2 2% PETG2(slip) | 5 |  |
| 9 | 1 | 99.30% PETG1 0.70% PETG3(antiblock) | 5 | 30 |
|  | 2 | 100% EMA1 | 6 |  |
|  | 3 | 100% PETG1 | 14 |  |
|  | 4 | 98% PET2 2% PETG2(slip) | 5 |  |
| 10 | 1 | 90% PET1 10% PETG1 | 5 | 30 |
|  | 2 | 70% EMA1 30% EMA2 | 6 |  |
|  | 3 | 100% PETG1 | 14 |  |
|  | 4 | 98% PET2 2% PETG2(slip) | 5 |  |
| 11 | 1 | 90% PET1 10% PETG1 | 5 | 30 |
|  | 2 | 70% EMA1 30% LLDPE | 6 |  |
|  | 3 | 100% PETG1 | 14 |  |
|  | 4 | 98% PET2 2% PETG2(slip) | 5 |  |
| 12 | 1 | 90% PET1 10% PETG1 | 5 | 30 |
|  | 2 | 90% EMA1 10% EMA3 | 6 |  |
|  | 3 | 100% PETG1 | 14 |  |
|  | 4 | 98% PET2 2% PETG2(slip) | 5 |  |
| 13 | 1 | 99.30% PETG1 0.70% PETG3(antiblock) | 5 | 30 |
|  | 2 | 70% EMA1 30% EMA2 | 6 |  |
|  | 3 | 100% PETG1 | 14 |  |
|  | 4 | 98% PET2 2% PETG2(slip) | 5 |  |
| 14 | 1 | 99.30% PETG1 0.70% PETG3(antiblock) | 2 | 30 |
|  | 2 | 70% EMA1 30% PP-ter | 6 |  |
|  | 3 | 100% PETG1 | 16 |  |
|  | 4 | 98% PET2 2% PETG2(slip) | 6 |  |
| 15 | 1 | 90% PET1 10% PETG1 | 4 | 27 |
|  | 2 | 80% EMA1 20% PB | 8 |  |
|  | 3 | 98% PET2 2% PETG2(slip) | 15 |  |
| 16 | 1 | 90% PET1 10% PETG1 | 4 | 27 |
|  | 2 | 100% EMA1 | 8 |  |
|  | 3 | 98% PET2 2% PETG2(slip) | 15 |  |
| 17 | 1 | 30% PET1 70% PETG4 | 5 | 27 |
|  | 2 | 80% EMA1 20% EPC1 | 6 |  |
|  | 3 | 60% PET2 40% PETG1 | 13 |  |
|  | 4 | 98% PET2 2% PETG2(slip) | 3 |  |
| 18 | 1 | 30% PET1 70% PETG4 | 5 | 27 |
|  | 2 | 80% EMA1 20% PB | 6 |  |
|  | 3 | 60% PET2 40% PETG1 | 13 |  |
|  | 4 | 98% PET2 2% PETG2(slip) | 3 |  |
| 19 | 1 | 90% PET1 10% PETG1 | 6 | 30 |
|  | 2 | 100% EMA5 | 5 |  |
|  | 3 | 60% PET2 40% PETG1 | 16 |  |
|  | 4 | 98% PET2 2% PETG2(slip) | 3 |  |
| 20 | 1 | 90% PET1 10% PETG1 | 6 | 30 |
|  | 2 | 100% LLDPE-md1 | 5 |  |
|  | 3 | 60% PET2 40% PETG1 | 16 |  |
|  | 4 | 98% PET2 2% PETG2(slip) | 3 |  |

TABLE 2-continued

Examples and comparative Example

| Film n. | Layer | Layer composition | Layer thickness (microns) | Film thickness (microns) |
|---|---|---|---|---|
| 21 | 1 | 90% PET1 10% PETG1 | 5 | 27 |
| | 2 | 100% EMA-md1 | 5 | |
| | 3 | 60% PET2 40% PETG1 | 14 | |
| | 4 | 98% PET2 2% PETG2(slip) | 3 | |
| 22 | 1 | 90% PET1 10% PETG1 | 6 | 30 |
| | 2 | 100% EMA-md1 | 5 | |
| | 3 | 60% PET2 40% PETG1 | 16 | |
| | 4 | 98% PET2 2% PETG2(slip) | 3 | |
| 23 | 1 | 90% PET1 10% PETG1 | 5 | 27 |
| | 2 | 100% LLDPE-md1 | 6 | |
| | 3 | 60% PET2 40% PETG1 | 13 | |
| | 4 | 98% PET2 2% PETG2(slip) | 3 | |
| 24 | 1 | 90% PET1 10% PETG1 | 5 | 27 |
| | 2 | 100% LLDPE-md2 | 6 | |
| | 3 | 60% PET2 40% PETG1 | 13 | |
| | 4 | 98% PET2 2% PETG2(slip) | 3 | |
| 25 | 1 | 90% PET1 10% PETG1 | 5 | 27 |
| | 2 | 50% EMA5 50% LLDPE-md1 | 6 | |
| | 3 | 60% PET2 40% PETG1 | 13 | |
| | 4 | 98% PET2 2% PETG2(slip) | 3 | |
| 26 | 1 | 90% PET1 10% PETG1 | 6 | 30 |
| | 2 | 100% EMA-md2 | 6 | |
| | 3 | 60% PET2 40% PETG1 | 15 | |
| | 4 | 98% PET2 2% PETG2(slip) | 3 | |
| 27 | 1 | 90% PET1 10% PETG1 | 5 | 27 |
| | 2 | 70% EMA1 30% LLDPE-md1 | 6 | |
| | 3 | 60% PET2 40% PETG1 | 13 | |
| | 4 | 98% PET2 2% PETG2(slip) | 3 | |
| 28 | 1 | 90% PET1 10% PETG1 | 6 | 32 |
| | 2 | 70% EMA-md2 30% LLDPE-md1 | 7 | |
| | 3 | 60% PET2 40% PETG1 | 14 | |
| | 4 | 98% PET2 2% PETG2(slip) | 5 | |
| 29 | 1 | 90% PET1 10% PETG1 | 5 | 31 |
| | 2 | 80% EMA-md2 20% PB | 7 | |
| | 3 | 60% PET2 40% PETG1 | 16 | |
| | 4 | 98% PET2 2% PETG2(slip) | 3 | |
| 30 | 1 | 90% PET1 10% PETG1 | 5 | 30 |
| | 2 | 80% EMA1 20% PB | 5 | |
| | 3 | 60% PET2 40% PETG1 | 16 | |
| | 4 | 98% PET2 2% PETG2(slip) | 4 | |
| 31 | 1 | 90% PET1 10% PETG1 | 5 | 27 |
| | 2 | 80% EMA-md1 20% PB | 6 | |
| | 3 | 60% PET2 40% PETG1 | 13 | |
| | 4 | 98% PET2 2% PETG2(slip) | 3 | |
| 32 | 1 | 90% PET1 10% PETG1 | 5 | 27 |
| | 2 | 80% EMA5 20% PB | 6 | |
| | 3 | 60% PET2 40% PETG1 | 13 | |
| | 4 | 98% PET2 2% PETG2(slip) | 3 | |
| 33 | 1 | 90% PET1 10% PETG1 | 5 | 27 |
| | 2 | 80% EMA-md3 20% PB | 6 | |
| | 3 | 60% PET2 40% PETG1 | 13 | |
| | 4 | 98% PET2 2% PETG2(slip) | 3 | |
| 34 | 1 | 90% PET1 10% PETG1 | 3 | 27 |
| | 2 | 100% LLDPE-md4 | 10 | |
| | 3 | 60% PET2 40% PETG1 | 11 | |
| | 4 | 98% PET2 2% PETG2(slip) | 3 | |
| 35 | 1 | 30% PET1 70% PETG4 | 5 | 27 |
| | 2 | 80% EEA1 20% PB | 6 | |
| | 3 | 60% PET2 40% PETG1 | 13 | |
| | 4 | 98% PET2 2% PETG2(slip) | 3 | |
| 36 | 1 | 30% PET1 70% PETG4 | 5 | 27 |
| | 2 | 80% EAA1 20% PB | 6 | |
| | 3 | 60% PET2 40% PETG1 | 13 | |
| | 4 | 98% PET2 2% PETG2(slip) | 3 | |
| 37 | 1 | 30% PET1 70% PETG4 | 5 | 27 |
| | 2 | 80% EMAA-Zn1 20% PB | 6 | |
| | 3 | 60% PET2 40% PETG1 | 13 | |
| | 4 | 98% PET2 2% PETG2(slip) | 3 | |
| 38 | 1 | 30% PET1 70% PETG4 | 5 | 27 |
| | 2 | 80% EBA1 20% PB | 6 | |
| | 3 | 60% PET2 40% PETG1 | 13 | |
| | 4 | 98% PET2 2% PETG2(slip) | 3 | |

TABLE 2-continued

Examples and comparative Example

| Film n. | Layer | Layer composition | Layer thickness (microns) | Film thickness (microns) |
|---|---|---|---|---|
| 39 | 1 | 30% PET1 70% PETG4 | 5 | 27 |
| | 2 | 90% EEA1 10% PB | 6 | |
| | 3 | 60% PET2 40% PETG1 | 13 | |
| | 4 | 98% PET2 2% PETG2(slip) | 3 | |
| 40 | 1 | 90% PET1 10% PETG | 5 | 27 |
| | 2 | 100% EMA-md3 | 6 | |
| | 3 | 60% PET2 40% PETG1 | 13 | |
| | 4 | 98% PET2 2% PETG2(slip) | 3 | |
| 41 | 1 | 90% PET1 10% PETG | 5 | 27 |
| | 2 | 90% EMA-md3 10% PB | 6 | |
| | 3 | 60% PET2 40% PETG1 | 13 | |
| | 4 | 98% PET2 2% PETG2(slip) | 3 | |
| C1 | 1 | 90% PET1 10% PETG | 4 | 20 |
| | 2 | 60% PET2 40% PETG1 | 12 | 20 |
| | 3 | 98% PET2 PETG2 | 4 | |

All the films were manufactured through a flat coextrusion process followed by in-line simultaneous Tenterframe orientation. Main operating conditions used to stretch and heat-set the films are:
MD ratio: 3.6:1;
TD ratio: 3.6:1;
Pre-heating temperature: 98° C.;
Stretching Temperature: 98° C.;
Heat-setting Temperature: 158° C.

The films so obtained were cooled down first by an air flow at 30° C. and then by passing onto a cooling roll that was cooled with water and kept at 20° C.

Example 2—Coating of Films

The sealant surface of some of the films of the invention was coated using a DCM coater with a composition having the following composition:
9% Antifog additive (see Table 1)
17% ethyl acetate
74% water.
The coating line was set-up as follows:
Line speed: 100 m/min
Engraved roll: 320 lines/cm
Drying temperature: 70-80° C.
The coated films were cooled down, before being wound up, by passing onto a roll that was cooled with water and kept at 20° C.
The coating grammage obtained for all the films was 50 mg/sqm.

Example 3—Characterization of Films

Clarity and Haze
Clarity and haze of some of the coated films and of uncoated films 33 and 34 have been evaluated according to the standard test method ASTM D1003. The results of the test are reported in Table 3 below.

TABLE 3

Clarity and Haze values of films

| Film No. | Clarity (%) | Haze (%) |
|---|---|---|
| Coated film 1 | 86.5 | 3.5 |
| Coated film 2 | 82.5 | 2.5 |
| Coated film 4 | 76 | 2.5 |
| Coated film 5 | 58.5 | 4.5 |
| Coated film 6 | 56 | 4 |
| Coated film 8 | 79 | 2 |
| Coated film 9 | 94 | 3 |
| Coated film 10 | 96.5 | 1.5 |
| Coated film 11 | 77.5 | 3 |
| Coated film 13 | 95 | 3 |
| Coated film 14 | 70.5 | 3.5 |
| Coated film 19 | 97.6 | 1.6 |
| Coated film 20 | 95.4 | 1.9 |
| Coated film 21 | 95.4 | 1.9 |
| Coated film 22 | 90 | 3 |
| Coated film 26 | 98 | 1.7 |
| Coated film 28 | 96.4 | 1.9 |
| Coated film 29 | 97 | 1.7 |
| Coated film 30 | 91 | 3.7 |
| Film 33 | 91.2 | 1.7 |
| Film 34 | 99.7 | 0.5 |

As can be seen from the data above, all films according to the invention show excellent optics.

Antifog Test (Score)

A packaging film is defined as "antifog" if its internal surface allows the droplets of water to lay as a smooth and uniform layer allowing visual inspection of the packaged product.

An internal test method was used to evaluate the antifog performance of some of the coated film prepared as described above.

In details, 250 ml of water were placed in a 900 ml glass vessel. The film was then secured through a rubber band tightly over the vessel; the sealant side of the film was placed towards the water without being into contact with the liquid. The vessel was then placed in a refrigerated cooler at 2-4° C. Three vessels were prepared for each film.

The specimens so prepared were then observed after 24 and 48 hours and scored by three panelists according to the following rating scale, ordered from very poor to excellent antifog properties:
score 1: opaque layer of small fog droplets;
score 2: opaque or transparent layer of large droplets;
score 3: complete layer of large transparent droplets;
score 4: randomly distributed or large transparent droplets;
score 5: transparent film without visible water.

The final antifog score is the average of three panelists' judgment. The results of this test are reported in table 4 below:

TABLE 4

Antifog scores

| Film No. | Score at 24 hours | Score at 48 hours |
|---|---|---|
| Coated film 1 | 5 | 5 |
| Coated film 4 | 5 | 5 |
| Coated film 5 | 5 | 5 |

TABLE 4-continued

Antifog scores

| Film No. | Score at 24 hours | Score at 48 hours |
|---|---|---|
| Coated film 6 | 5 | 5 |
| Coated film 8 | 5 | 5 |
| Coated film 14 | 5 | 5 |

As can be seen, all coated films show excellent antifog properties at both timepoints.

Example 4—Characterization of Films in Sealed Trays

The films of the invention and the comparative film C1 were sealed at different sealing conditions and onto different trays, as will be described below. The seals were clean, i.e. the films were sealed onto the tray keeping the tray flange under clean (i.e. non contaminated) conditions and no product was packaged.

Opening and hermeticity of the packages obtained were evaluated according to the test method described below.

Hermeticity Test

The packages obtained were put in a closed water tank. Vacuum was created in the headspace of the water tank and recording was taken of the value of the pressure (in bars) inside the tank when bubbles start to escape from the closed packages. Twenty packages were tested for each sealing condition and the average pressure value was calculated, corresponding to the Dopack value for that package.

The packages were considered to provide a hermetic seal fit for use when they had a Dopack value higher than 0.25 (indicated as Hermetic Seal in the tables below). Packages with a Dopack value equal or lower to 0.25 were considered as not providing any hermetic seal.

Opening of the Packages

The opening of the packages was manually tested by 2 panelists on least 10 packs each.

The quality of the opening was recorded and average outcome of the test evaluated and classified, according to the parameters indicated below.

Easy Opening:
+: the package is opened easily and effortlessly with application of a moderate force by the panelist
−: the package does not open with application of a moderate force by the panelist Sharding:
+: the lidding film tears upon opening;
+/−: some random tearing of the lidding film
−: the lidding film does not tear upon opening Angel Hairs:
+: angel hairs remain on the flange of the tray
+/−: some random angel hairs remain on the flange of the tray
−: no angel hairs remain on the flange of the tray Residue on the Flange of the Tray:
All the films showed a residue on the flange of the tray. This was classified as follows:
+: white visible residue
−: transparent residue
+/−: both white and transparent residue a) Packages with CPET Trays Films 1-14 were sealed onto CPET Faerch 2155-1E trays, using a Mecaplastic 1000 heat sealing machine. Sealing time was 1 second. The sealing temperatures used for each film are reported in table 5.

Hermeticity and opening were evaluated as described above and the outcome reported in the following table 5

TABLE 5

Films sealed to CPET trays

| Film No. | Sealing Temp (° C.)/1 sec | Hermeticity (dopack value) | Easy Opening | Sharding | Angel hairs | Residue |
|---|---|---|---|---|---|---|
| 1 | 140° C. | 0.4 | + | +/− | − | − |
| 2 | 140° C. | 0.49 | + | − | − | +/− |
| 3 | 145° C. | 0.35 | + | − | − | +/− |
| 4 | 140° C. | 0.4 | + | − | − | + |
| 5 | 140° C. | 0.4 | + | − | − | + |
| 6 | 140° C. | 0.43 | + | − | − | + |
| 7 | 140° C. | 0.35 | + | − | − | +/− |
| 8 | 140° C. | 0.4 | + | − | +/− | + |
| 9 | 160° C. | 0.45 | + | +/− | − | − |
| 10 | 140° C. | 0.38 | + | − | − | +/− |
| 11 | 140° C. | 0.4 | + | − | − | +/− |
| 12 | 140° C. | 0.4 | + | − | − | +/− |
| 13 | 140° C. | 0.50 | + | +/− | − | − |
|  | 165° C. | 0.3 | + | +/− | − | − |
| 14 | 140° C. | 0.35 | + | − | − | +/− |

As can be seen from the results above, the packages obtained with all the films of the invention show a high hermeticity combined with easy opening.

b) Packages with APET Trays

Some of the films of the invention were also tested on APET trays, particularly used in the packaging of moist or respiring food products.

The films indicated in table 6 below were sealed onto a Silver Plastic APET 1826 tray, using a Sealpac A7 machine equipped with a flat seal bar or a convex seal bar, at the different sealing temperatures and times reported in table 6. Sealing time was 1 second.

Hermeticity and opening of package were evaluated as described above. The results are reported in table 6 below.

TABLE 6

| Films sealed to APET trays | | | | | | | |
|---|---|---|---|---|---|---|---|
| | | 110° C./1 sec | | 130° C./1 sec | | 160° C./1 sec | |
| Film | Test | Flat bar | Convex bar | Flat bar | Convex bar | Flat bar | Convex bar |
| 1 | Hermeticity (dopack v.) | 0.36 | 0.23 | 0.37 | 0.33 | 0.42 | 0.35 |
|  | Opening of package | | | | | | |
|  | Easy op. | + | + | + | + | + | + |
|  | Sharding | NA | NA | +/− | +/− | + | + |

TABLE 6-continued

| | | Films sealed to APET trays | | | | | |
|---|---|---|---|---|---|---|---|
| | | 110° C./1 sec | | 130° C./1 sec | | 160° C./1 sec | |
| Film | Test | Flat bar | Convex bar | Flat bar | Convex bar | Flat bar | Convex bar |
| | Angel hairs | NA | NA | − | − | − | − |
| | Residual on flange | NA | NA | − | − | − | − |
| 6 | Hermeticity (dopack v.) | 0.3 | 0.24 | 0.3 | 0.28 | 0.34 | 0.32 |
| | Opening of package | | | | | | |
| | Easy op. | + | + | + | + | + | + |
| | Sharding | NA | NA | − | − | − | − |
| | Angel hairs | NA | NA | − | − | − | − |
| | Residual on flange | NA | NA | + | + | + | + |
| C1 | Hermeticity | Strong sealing hermetic | Strong sealing hermetic | Strong sealing hermetic | Strong sealing hermetic | NA | NA |
| | Easy opening | − | − | − | − | − | − |

Hermeticity combined with easy opening of the packages was observed for the films according to the invention while the comparative film, although having an identical sealing layer as film 6, shows excellent sealability performances but does not open easily.

c) Packages with RPET Trays

The coated and uncoated films indicated in table 7 were sealed onto a Infia K37 tray, using a Proseal GTO tooling 1218OC solo convex bar w=5 mm r=10 mm sealing machine. Sealing time was 1 second. Sealing temperatures used for each film are reported below.

Hermeticity and opening of the package were evaluated as described above. The results are reported in table 7 below.

TABLE 7

| | | | Films sealed to RPET trays | | | |
|---|---|---|---|---|---|---|
| | Sealing | Hermeticity | | Opening of package | | |
| Film No. | Temp (° C.)/ 1 sec | (dopack) value | Sharding | Easy opening | Angel hairs | Residual on flange |
| Coated film 1 | 120° C. | No seal | | | | |
| | 130° C. | 0.24 | +/− | + | − | − |
| | 140° C. | 0.32 | +/− | + | − | − |
| | 150° C. | 0.32 | + | + | − | − |
| | 160° C. | 0.4 | + | + | − | − |
| Coated film 4 | 120° C. | No seal | | | | |
| | 130° C. | 0.26 | − | + | − | +/− |
| | 140° C. | NA | − | + | − | +/− |
| | 150° C. | 0.31 | − | + | − | +/− |
| | 160° C. | 0.33 | − | + | − | +/− |
| Coated film 5 | 120° C. | NA | − | + | +/− | +/− |
| | 130° C. | NA | − | + | +/− | +/− |
| | 140° C. | 0.3 | − | + | +/− | +/− |
| | 150° C. | 0.28 | − | + | − | +/− |
| | 160° C. | 0.31 | − | + | − | +/− |
| Coated film 6 | 120° C. | No seal | | | | |
| | 130° C. | 0.3 | − | + | − | +/− |
| | 140° C. | 0.32 | − | + | − | + |
| | 150° C. | 0.36 | − | + | − | + |
| | 160° C. | 0.36 | − | + | − | + |
| Coated film 8 | 120° C. | No seal | | | | |
| | 130° C. | 0.25 | − | + | +/− | +/− |
| | 140° C. | 0.28 | − | + | +/− | +/− |
| | 150° C. | 0.29 | − | + | +/− | +/− |
| | 160° C. | 0.29 | − | + | +/− | +/− |
| Film 15 | 130° C. | 0.39 | − | + | NA | + |
| Film 16 | 130° C. | 0.41 | − | + | NA | + |
| Film 19 | 130° C. | 0.25 | − | + | +/− | +/− |
| Coated film 20 | 120° C. | 0.31 | − | + | +/− | +/− |
| | 130° C. | 0.32 | − | + | +/− | +/− |
| | 160° C. | 0.36 | − | + | +/− | +/− |

TABLE 7-continued

Films sealed to RPET trays

| Film No. | Sealing Temp (° C.)/ 1 sec | Hermeticity (dopack) value | Opening of package | | | |
|---|---|---|---|---|---|---|
| | | | Sharding | Easy opening | Angel hairs | Residual on flange |
| Coated film 21 | 120° C. | 0.25 | +/− | + | − | − |
| | 130° C. | 0.38 | +/− | + | − | − |
| | 160° C. | 0.42 | − | + | − | +/− |
| Coated film 22 | 120° C. | 0.29 | +/− | + | − | − |
| | 130° C. | 0.34 | +/− | + | − | − |
| | 160° C. | 0.37 | − | + | − | +/− |
| Coated film 23 | 130° C. | 0.29 | +/− | + | +/− | − |
| Coated film 24 | 130° C. | 0.34 | + | + | − | − |
| Coated film 25 | 130° C. | 0.3 | − | + | +/− | +/− |
| Coated film 26 | 120° C. | 0.26 | − | + | +/− | +/− |
| | 130° C. | 0.38 | − | + | +/− | +/− |
| | 160° C. | 0.4 | − | + | +/− | + |
| Coated film 27 | 130° C. | 0.36 | − | + | − | + |
| Coated film 28 | 120° C. | 0.28 | − | + | − | − |
| | 130° C. | 0.39 | − | + | − | − |
| | 160° C. | 0.43 | − | + | − | − |
| Coated film 29 | 120° C. | 0.27 | − | + | − | +/− |
| | 130° C. | 0.31 | − | + | − | +/− |
| | 160° C. | 0.32 | − | + | − | +/− |
| Coated film 30 | 120° C. | 0.3 | − | + | − | +/− |
| | 130° C. | 0.34 | − | + | − | + |
| | 160° C. | 0.34 | − | + | − | + |
| Coated film 31 | 120° C. | 0.28 | − | + | +/− | +/− |
| | 130° C. | 0.34 | − | + | +/− | +/− |
| | 160° C. | 0.35 | − | + | +/− | + |
| Film 32 | 130° C. | 0.27 | − | + | +/− | +/− |
| Film 40 | 130° C. | | | | | +/− |
| Film 41 | 130° C. | | | | | + |

Also the packages obtained with RPET containers and the films of the invention show hermeticity combined with easy opening properties.

From the results obtained, the film of the invention allows to obtain films with antifog coating with good sealability and easy opening.

The invention claimed is:

1. A heat sealable, optionally oriented, coextruded multilayer polyester based lidding film comprising at least the following layers:
   1) a heat-sealable layer 1) which is a first outer layer of the lidding film and is a polyester based first outer layer, comprising at least 60 wt % polyesters of aromatic dicarboxylic acids, the heat-sealable layer being heat sealable at a temperature of from 110° C. to 150° C. and the film having a Dopack value of at least 0.25 when the heat-sealable layer 1) is sealed to a CPET Faerch 2155-1E tray, using a Mecaplastic 1000 heat sealing machine with a sealing time of 1 second at a pressure of 2 to 10 bar;
   2) an inner layer 2) comprising at least 95 wt % of a composition consisting of:
      a) between 40 and 99 wt % of one or more polymers selected from ethylene (meth)acrylate/(meth)acrylic acid copolymers, anhydride modified ethylene(meth)acrylate/(meth)acrylic acid copolymers, anhydride modified ethylene alpha olefin copolymers and mixtures thereof,
      b) between 1 and 60 wt % of one or more further polymers selected from polyolefins, ethylene vinyl acetate copolymers (EVA) and mixtures thereof;
   3) a polyester based layer 3) comprising at least 60 wt % of polyesters of aromatic dicarboxylic acids; wherein layer 2) adheres to layer 1) and layer 3);

wherein the lidding film comprises at least 60 wt % polyesters;
   the lidding film further comprising an antifog agent coated on the surface of the heat-sealable layer 1) in an amount of from 40 mg/sqm to 140 mg/sqm; and
   a second outer layer of the lidding film, which is opposite to the heat sealable layer 1), comprises at least 90 wt % polyesters.

2. A heat sealable film according to claim 1, wherein the overall composition of the film comprises at least 60 wt % polyesters of aromatic dicarboxylic acids or polyesters of terephthalic acid.

3. A heat sealable film according to claim 1, having between 3 and 10 layers and having a total thickness between 3 and 100 microns and wherein heat-sealable layer 1) has a thickness comprised between 0.5 and 15 microns and layer 2) has a thickness comprised between 2 and 30 microns and layer 3) has a thickness comprised between 5 and 60 microns.

4. A heat sealable film according to claim 1, which is heat shrinkable film with a percentage of free shrink at 120° C. of at least 5% in longitudinal and/or transverse direction, measured in oil according to ASTM D 2732 and/or oriented, with an orientation ratio between about 2:1 and about 5:1 in both longitudinal and transverse direction.

5. Heat sealable film according to claim 1, wherein said composition of layer 2) comprises an amount of at least 45 wt % of one or more polymers selected from ethylene (meth)acrylate/(meth)acrylic acid copolymers, anhydride modified ethylene (meth)acrylate/(meth)acrylic acid copolymers and anhydride modified ethylene alpha olefin copolymers.

6. Heat sealable film according to claim 1, wherein said composition of layer 2) consists of 99 wt % of one or more polymers selected from ethylene (meth)acrylate/(meth)acrylic acid copolymers, anhydride modified ethylene (meth)acrylate/(meth)acrylic acid copolymers and anhydride modified ethylene alpha olefin copolymers and 1 wt % of one or more further polymers selected from polyolefins, ethylene vinyl acetate copolymers (EVA) and mixtures thereof.

7. Heat sealable film according to claim 1, wherein said ethylene (meth)acrylate copolymers are selected from ethylene C1-C4 alkyl (meth)acrylate copolymers comprising between 5 and 40 wt % methyl acrylate.

8. Heat sealable film according to claim 1, wherein the between 40 and 99 wt % of one or more polymers of inner layer 2) are anhydride modified ethylene (C4-C10) alpha olefin copolymers.

9. Heat sealable film according to claim 1, wherein said anhydride modified ethylene (meth)acrylate/(meth)acrylic acid copolymers are maleic anhydride modified and/or said ethylene (meth)acrylate/(meth)acrylic acid copolymers are ethylene methylacrylate copolymers.

10. Heat sealable film according to claim 1, wherein said polyolefins in the composition of layer 2) are selected from propylene/ethylene/butene copolymers and propylene/ethylene copolymers; polybutenes and ethylene alfa olefin copolymers, ethylene C4-C10 alpha olefin copolymers, linear low density polyethylenes and/or said ethylene vinyl acetate copolymers (EVA) are ethylene/vinyl acetate/carbon monoxide copolymers, with a comonomer content between 20 and 30 wt %.

11. Heat sealable film according to claim 1, wherein the heat sealable layer 1) comprises at least 90 wt % of one or more polyesters and the second outer layer of the film is the polyester based layer 3).

12. Heat sealable film according to claim 1, wherein the polyesters in heat-sealable layer 1) comprise at least 50 wt % of amorphous polyesters and/or said polyesters are copolyesters.

13. Heat sealable film according to claim 1, wherein the polyesters of an outer layer of the film, opposite to the heat-sealable layer 1, comprise at least 80 wt % of (semi)crystalline polyesters and an amount between 1 and 5 wt % of amorphous polyesters and/or said polyesters are copolyesters.

14. Heat sealable film according to claim 1, wherein the film has more than 3 layers and layer 3) comprises at least 90 wt % of one or more polyesters.

15. Heat sealable film according to claim 14, wherein said polyesters consist of an amount between 50 wt % and 100 wt % of (semi) crystalline polyesters and an amount between 0 and 50 wt % of amorphous polyesters and/or said polyesters are copolyesters.

16. Heat sealable film according to claim 1, further comprising an antifog agent coated on at least the surface of the heat-sealable layer 1).

17. A heat sealable film according to claim 1, wherein the overall composition of the film comprises at least 80 wt % of polyesters selected from aromatic dicarboxylic acids or terephthalic acid.

18. Heat sealable film according to claim 1, wherein the polyester based layer 3) is an inner layer of the film.

\* \* \* \* \*